US007892507B2

(12) United States Patent
Rohart et al.

(10) Patent No.: US 7,892,507 B2
(45) Date of Patent: Feb. 22, 2011

(54) GAS PROCESSING FOR CATALYTICALLY OXIDIZING CARBON MONOXIDE AND HYDROCARBONS IN THE PRESENCE OF A METAL/SILICA-CONTAINING ZIRCONIA CATALYST

(75) Inventors: Emmanuel Rohart, Sainte Soulle (FR); Stéphan Verdier, Lyons (FR); Aimin Huang, Shangai (CN)

(73) Assignee: Rhodia Chimie, Aubervilliers (FR)

( * ) Notice: Subject to any disclaimer, the term of this patent is extended or adjusted under 35 U.S.C. 154(b) by 57 days.

(21) Appl. No.: 11/922,948

(22) PCT Filed: Jun. 27, 2006

(86) PCT No.: PCT/FR2006/001491

§ 371 (c)(1),
(2), (4) Date: Jul. 17, 2009

(87) PCT Pub. No.: WO2007/000514

PCT Pub. Date: Jan. 4, 2007

(65) Prior Publication Data

US 2009/0269263 A1 Oct. 29, 2009

(30) Foreign Application Priority Data

Jun. 27, 2005 (FR) .................................. 05 06503

(51) Int. Cl.
*B01D 53/62* (2006.01)
*B01D 53/72* (2006.01)
*B01D 53/94* (2006.01)
*F01N 3/10* (2006.01)

(52) U.S. Cl. .............. 423/213.2; 423/213.5; 423/245.3; 423/247; 422/168; 422/177; 422/180; 60/299

(58) Field of Classification Search .............. 423/213.2, 423/213.5, 245.3, 247; 422/168, 177, 180; 60/299

See application file for complete search history.

(56) References Cited

U.S. PATENT DOCUMENTS

| 3,068,169 | A | | 12/1962 | Eastwood et al. |
| 3,956,185 | A | | 5/1976 | Yagi et al. |
| 5,145,825 | A | | 9/1992 | Deeba et al. |
| 5,451,388 | A | | 9/1995 | Chen et al. |
| 5,610,117 | A | * | 3/1997 | Horiuchi et al. ............. 502/324 |
| 5,849,256 | A | | 12/1998 | Deeba et al. |
| 2003/0140620 | A1 | * | 7/2003 | Shigapov et al. ............. 60/286 |

FOREIGN PATENT DOCUMENTS

| WO | WO 90/05579 A1 | 5/1990 |
| WO | WO 98/45212 | 4/1998 |

OTHER PUBLICATIONS

The English abstract of IN 200000547 13 dated Jul. 1, 2005.*
S. Brunauer et al., "Adsorption of Gases in Multimolecular Layers", *The Journal of the American Chemical Society*, vol. 60, Feb. 1938, pp. 309-319.

* cited by examiner

*Primary Examiner*—Timothy C Vanoy
(74) *Attorney, Agent, or Firm*—Buchanan, Ingersoll & Rooney, P.C.

(57) ABSTRACT

The processing of gases, in particular the exhaust gas of an internal combustion/diesel engine, entails catalytically oxidizing the carbon monoxide and hydrocarbons contained therein in an oxygen-rich medium, in the presence of a metal oxidation catalyst that includes a silica-containing zirconia support.

20 Claims, No Drawings

GAS PROCESSING FOR CATALYTICALLY OXIDIZING CARBON MONOXIDE AND HYDROCARBONS IN THE PRESENCE OF A METAL/SILICA-CONTAINING ZIRCONIA CATALYST

CROSS-REFERENCE TO PRIORITY/PCT APPLICATIONS

This application claims priority under 35 U.S.C. §119 of FR 05/06503, filed Jun. 27, 2005, and is a continuation of PCT/FR 2006/001491, filed Jun. 27, 2006 and designating the United States (published in the French language on Jan. 4, 2007, as WO 2007/000514 A2; the title and abstract were published in English), each hereby expressly incorporated by reference in its entirety and each assigned to the assignee hereof.

The invention relates to a process for the treatment of gases, in particular exhaust gases from an internal combustion engine, for the catalytic oxidation of carbon monoxide and hydrocarbons.

It is known that the standards in automobile afterburning, which limit the emissions of carbon monoxide and hydrocarbons, will become tougher and apply not only to conventional gasoline engines but also to engines of diesel type. It is also known that engines of the latter type emit exhaust gases which continually comprise an excess of oxygen. For this reason, three-way catalysts are of limited effectiveness in the treatment of these gases as any excess in oxygen is reflected by a sudden deterioration in their performance. In addition, it is necessary, still in the case of engines of this type, to have catalysts capable of being effective at relatively low temperatures, that is to say within a range from 150° C. to 300° C. approximately. In addition, it is necessary to be able to have available catalysts having an enhanced resistance to sulfation insofar as diesel fuels generally have higher sulfur contents than that of fuels for gasoline engines.

The object of the invention is thus to provide a catalyst suitable for the treatment of oxygen-rich gases which exhibits a significant activity from low temperatures.

Another object is to provide a catalyst with improved resistance to sulfation.

With this aim, the process according to the invention for the treatment of gases for the catalytic oxidation of carbon monoxide and hydrocarbons which are present therein, in an oxygen-rich medium, is characterized in that use is made, as catalyst, of a composition based on a metal which is an oxidation catalyst and on a silica-comprising zirconia.

The process of the invention, due to the catalyst used, is effective at temperatures as low as 200° C.-220° C., it being possible for these temperatures to be even lower when the catalyst has not yet aged. It can be employed even with sulfur-comprising fuels and, finally, the catalyst used exhibits good resistance to aging.

Other characteristics, details and advantages of the invention will become even more fully apparent on reading the description which will follow and various concrete but non-limiting examples intended to illustrate it.

In the continuation of the description, the term "specific surface" is understood to mean the B.E.T. specific surface determined by nitrogen adsorption in accordance with the standard ASTM D 3663-78, drawn up from the Brunauer-Emmett-Teller method described in the journal "The Journal of the American Chemical Society, 60, 309 (1938)".

Likewise, in the present description, the term "rare earth metal" is understood to mean the elements from the group consisting of yttrium and the elements of the Periodic Table with an atomic number of between 57 and 71 inclusive.

Finally, it is specified that, unless otherwise indicated, in the ranges of values which are given, the values at the limits are included.

The process of the invention relates to the catalytic oxidation of carbon monoxide and hydrocarbons which are present in gases. The gases capable of being treated in the context of the present invention are, for example, those resulting from gas turbines, from power plant boilers or from internal combustion engines. It furthermore involves the oxidation of the abovementioned compounds by oxygen, that is to say the reactions:

$$CO + 1/2 O_2 \rightarrow CO_2 \quad (1)$$

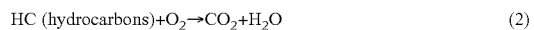

$$HC \text{ (hydrocarbons)} + O_2 \rightarrow CO_2 + H_2O \quad (2)$$

The oxygen is here the excess oxygen of the gases as the process is applied in an oxygen-rich medium. This is because the gases which are treated by this process exhibit an excess of oxygen with respect to the amount necessary for the stoichiometric combustion of the fuels and, more specifically, these gases exhibit an excess of oxygen with respect to the stoichiometric value $\gamma=1$. Gases are thus concerned for which the value of $\gamma$ is greater than 1. This value $\gamma$ is correlated with the air/fuel ratio in a way known per se, in particular in the field of internal combustion engines. Such gases can be those of gasoline engines operating under lean burn conditions and which have an oxygen content (expressed by volume) for example of at least 2%, and also those which have an even higher oxygen content, for example gases from engines of the diesel type, that is to say of at least 5% or of more than 5%, more particularly of at least 10%, it being possible for this content to be, for example, between 5% and 20%.

It should be noted that, in addition to the oxidation reactions with (1) and with (2) mentioned above the process can also, during the treatment of the gases, employ an oxidation of the soluble organic fraction, that is to say the liquid hydrocarbons originating from the fuel and from the lubricating oil and which are adsorbed on the soot particles, and also an oxidation of oxygen-comprising compounds, such as aldehydes, to give carbon dioxide and water.

The process of the invention uses, as catalyst, a specific composition which will now be described more specifically.

This composition is based on a metal which is a catalyst of the oxidation reaction described above and on a zirconia which acts as support for said metal.

Mention may more particularly be made, as catalyst of this type, of the precious metals. This term is understood to mean gold, silver, and metals of the platinum group, that is to say ruthenium, rhodium, palladium, osmium, iridium and platinum. Platinum can be used very particularly. The precious metals can, of course, be used alone or in combination.

The amount of oxidation catalyst can be, for example, between 0.05% and 10% and more particularly between 0.1% and 5%, this amount being expressed as weight of the oxidation catalyst in metallic form with respect to the weight of the whole of the composition. It will be understood that this amount is given purely by way of indication, the minimum amount of oxidation catalyst being that below which the composition is no longer catalytically effective and the maximum content generally not being critical but depending essentially on the question of cost.

The composition used as catalyst in the process of the invention is based in addition on a zirconia, the essential characteristic of which is that of comprising silica.

The silica content can vary within a wide range. The minimum value is generally that from which the zirconia exhibits a satisfactory thermal stability and the maximum content that beyond which phases can appear which are capable of reducing the effectiveness of the composition. By way of example, this content can be between 1% and 50% and more particularly between 5 and 30%, this amount being expressed as weight of silica with respect to the zirconia+silica combination.

The zirconia of the composition can additionally comprise a rare earth metal, this rare earth metal being present in the oxide form. The rare earth metal can in particular be lanthanum, neodymium, praseodymium and yttrium. Generally, the content of rare earth metal can range up to 20%, this amount being expressed as weight of rare earth metal oxide with respect to the zirconia+silica+rare earth metal oxide combination.

The compositions based on zirconium and comprising silica in combination, optionally with a rare earth metal, are known products which can be prepared by various process types.

The process can be, for example, a process by coprecipitation of a zirconium compound with precursors of the silica and rare earth metal compounds. Another process which can be used consists in mixing a rare earth metal salt and a silicate with a zirconium sol; the suspension obtained is subsequently dried and then calcined. The term "zirconium sol" denotes any system composed of fine solid particles of colloidal dimensions, that is to say dimensions of between approximately 1 nm and approximately 500 nm, based on a zirconium compound, this compound generally being a zirconium oxide and/or oxide hydrate, such as a zirconium oxyhydroxide or a basic zirconium nitrate, in suspension in an aqueous liquid phase.

It is also possible to proceed by impregnation of the zirconium oxide using a solution of a silica precursor and of a rare earth metal compound.

Mention may be made, as zirconium compounds, of zirconium salts, for example chosen from nitrates, acetates or chlorides.

Mention may thus be made, as examples, of zirconyl nitrate or zirconyl chloride. Zirconyl nitrate is most generally used.

Use may be made, as precursor of the silicon, of a silicate of an alkali metal element, for example sodium, a silicon alkoxide or an alkyl siliconate of an alkali metal element, such as sodium or potassium, and mention may be made, as example, of potassium methyl siliconate.

Recourse may be had, for the rare earth metal compounds, to the salts of the latter, for example to nitrates, chlorides, sulfates or carbonates.

It is also possible to prepare the zirconia used in the process of the invention with a process which comprises the following stages:

(a) a zirconium compound, a silicon compound and, if appropriate, a compound of the rare earth metal are brought together in a basic medium, whereby a precipitate is obtained;
(b) said precipitate is heated in a liquid medium;
(c) a compound chosen from anionic surfactants, nonionic surfactants, polyethylene glycols, carboxylic acids and their salts, and surfactants of the carboxymethylated fatty alcohol ethoxylates type is added to the precipitate obtained in the preceding stage;
(d) the precipitate thus obtained is calcined.

That which was said above for the zirconium compounds and rare earth metal compounds also applies here. For the silicon compound, use may be made of the silica precursors described above and of a solution of silicic acid or a precipitated silica which can be obtained from the preceding precursors. Mention may also be made, as silicon compound, of a pyrogenic silica, for example of the Aerosil® type from Degussa. The silica can be provided in the form of a sol or of a suspension.

The medium in which the zirconium compound, the silicon compound and, if appropriate, the rare earth metal compound are brought together is rendered basic by using a base or a basic compound of the hydroxide type in particular. Mention may be made of alkali metal or alkaline earth metal hydroxides. Use may also be made of secondary, tertiary or quaternary amines. However, amines and ammonia may be preferred insofar as they reduce the risk of pollution by alkali metal or alkaline earth metal cations. Mention may also be made. of urea.

The basic compound is generally used in the form of an aqueous solution.

The way in which the zirconium compound, the silicon compound and, if appropriate, the rare earth metal compound are brought together is not critical. However, this operation of bringing together can be carried out by introducing, for example, a sodium silicate solution into a preprepared mixture of a solution of a zirconium compound and of a basic compound. It is also possible to simultaneously introduce, into a reactor, a solution of a zirconium compound and a preprepared mixture of a solution of a silicate and of a basic compound.

Stage (a) is preferably carried out at ambient temperature (20-25° C.).

The following stage (b) of the process is the stage of heating the precipitate in the liquid medium.

This heating operation can be carried out directly on the reaction medium obtained after stage (a) or on a suspension obtained after separation of the precipitate from the reaction medium, optional washing and returning the precipitate to water. The temperature at which the medium is heated is at least 100° C. and more particularly still at least 130° C. The heating operation can be carried out by introducing the liquid medium into a closed chamber (closed reactor of the autoclave type). Under the temperature conditions given above and in the aqueous medium, it may be specified, by way of illustration, that the pressure in the closed reactor can vary between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). Heating can also be carried out in an open reactor for the temperatures in the vicinity of 100° C.

Heating can be carried out either under air or under an inert gas atmosphere, preferably nitrogen in the latter case.

The duration of the heating can vary within wide limits, for example between 1 and 48 hours, preferably between 2 and 24 hours. Likewise, the rise in temperature takes place at a rate which is not critical and it is thus possible to reach the set reaction temperature by heating the medium for example, between 30 minutes and 4 hours, these values being given entirely by way of indication.

It is possible to carry out several heating operations. Thus, the precipitate obtained after the heating stage and optionally a washing operation can be resuspended in water and then another heating operation can be carried out on the medium thus obtained. This other heating operation takes place under the same conditions as those which have been described for the first.

The following stage (c) of the process consists in adding, to the precipitate resulting from the preceding stage, a compound that is chosen from anionic surfactants, nonionic surfactants, polyethylene glycols and carboxylic acids and their salts.

As regards this compound, reference may be made to the teaching of application WO 98/45212 and the surfactants described in this document may be used.

Mention may be made, as surfactants of the anionic type, of ethoxy carboxylates, ethoxylated fatty acids, sarcosinates, phosphate esters, sulfates, such as alkyl sulfates, alkyl ether sulfates and sulfated alkanolamide ethoxylates, or sulfonates, such as sulfosuccinates, alkylbenzenesulfonates or alkylnaphthalenesulfonates.

Mention may be made, as nonanionic surfactant, of acetylenic surfactants, alcohol ethoxylates, alkanolamides, amine oxides, ethoxylated alkanolamides, ethoxylated amines comprising long chains, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and alkylphenol ethoxylates. Mention may in particular be made of the products sold under the brands Igepal®, Dowanol®, Rhodamox® and Alkamide®.

As regards the carboxylic acids, use may in particular be made of aliphatic mono- or dicarboxylic acids and among these more particularly of saturated acids. Use may also be made of fatty acids and more particularly of saturated fatty acids. Mention may thus be made in particular of formic, acetic, propionic, butyric, isobutyric, valeric, caproic, caprylic, capric, lauric, myristic and palmitic acids. Mention may be made, as dicarboxylic acids, of oxalic, malonic, succinic, glutaric, adipic, pimelic, suberic, azelaic and sebacic acids.

The salts of the carboxylic acids can also be used, in particular the ammonium salts.

Mention may more particularly be made, by way of example, of lauric acid and ammonium laurate.

Finally, it is possible to use a surfactant which is chosen from those of the carboxymethylated fatty alcohol ethoxylates type.

The term "product of the carboxymethylated fatty alcohol ethoxylates type" is understood to mean the products composed of ethoxylated or propoxylated fatty alcohols comprising, at the chain end, a —CH$_2$—COOH group.

These products can correspond to the formula:

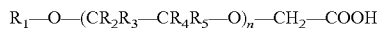

in which R$_1$ denotes a saturated or unsaturated hydrocarbon chain, the length of which is generally at most 22 carbon atoms, preferably at least 12 carbon atoms; R$_2$, R$_3$, R$_4$ and R$_5$ can be identical and represent hydrogen or also R$_2$ can represent a CH$_3$ group and R$_3$, R$_4$ and R$_5$ represent hydrogen; n is a nonzero integer which can range up to 50 and more particularly of between 5 and 15, these values being inclusive. It should be noted that a surfactant can be composed of a mixture of products of the above formula for which R$_1$ can be respectively saturated and unsaturated or also products comprising both —CH$_2$—CH$_2$—O— and —C(CH$_3$)—CH$_2$—O— groups.

The addition of the surfactant can be carried out in two ways. It can be added directly to the precipitate suspension resulting from the preceding heating stage (b). It can also be added to the solid precipitate after separation of the latter by any known means for a medium in which heating has taken place.

The amount of surfactant used, expressed as percentage by weight of surfactant with respect to the weight of the composition, calculated as oxide, is generally between 5% and 100%, more particularly between 15% and 60%.

In the case of the addition of the surfactant to the precipitate suspension, it is possible, after separation of the precipitate from the liquid medium, to wash the precipitate thus obtained.

In a final stage of the process, the precipitate recovered is subsequently calcined. This calcination makes it possible to develop the crystallinity of the product formed and it can also be adjusted and/or chosen according to the subsequent operating temperature reserved for the composition, this being the case taking into account the fact that the specific surface of the product decreases as the calcination temperature employed increases. Such a calcination is generally carried out under air while a calcination carried out, for example, under an inert gas or under a controlled atmosphere (oxidizing or reducing) is very clearly not excluded.

In practice, the calcination temperature is generally restricted to a range of values of between 500° C. and 1100° C., more particularly between 600° C. and 900° C.

The deposition of the metal which is an oxidation catalyst on the silica-comprising zirconia is carried out in a known way, for example by impregnation of the zirconia with a salt of the catalyst metal.

For the implementation of the process, the composition based on the metal and on the zirconia can be used in the powder form but it can optionally be shaped in order to be provided in the form of granules, beads, cylinders or honeycombs of variable dimensions.

This composition can also be used in a device comprising a coating (wash coat) based on the composition on a substrate of the, for example, metal or ceramic monolith type.

The invention thus also relates to a device for the implementation of the process as described above and which is characterized in that it comprises a coating based on this same composition on the abovementioned type of substrate. This device can be a component of a catalytic exhaust muffler fitted to a motor vehicle.

Examples will now be given.

EXAMPLE 1

This example relates to the preparation of a composition based on oxides of zirconium and of silicon in the respective proportions as weight of oxide of 90% and 10%.

A solution A is prepared by mixing 173.8 g of a zirconium nitrate solution (21% by weight, expressed as oxide) and 240 g of distilled water in a stirred beaker. At the same time, a solution B is prepared in another stirred beaker by mixing 100 ml of an aqueous ammonia solution (29 vol %) and 300 ml of distilled water.

Solution A is introduced into a stirred reactor and then solution B is gradually added with stirring. The pH of the medium reaches a value of at least 9.5. 21.3 g of a sodium silicate solution (19% by weight, expressed as oxide) are subsequently introduced, still gradually and with stirring.

The suspension thus obtained is placed in an autoclave made of stainless steel equipped with a stirrer. The temperature of the medium is brought to 150° C. for 2 hours with stirring.

After returning to ambient temperature, the precipitate obtained is filtered off and washed with distilled water.

48 g of this precipitate are withdrawn.

At the same time, an ammonium laurate gel is prepared under the following conditions: 13.3 g of lauric acid are introduced into 7.8 g of aqueous ammonia (29 vol %) and 27 ml of distilled water and then the mixture is homogenized using a spatula.

48 g of this gel are added to the 48 g of the precipitate and then the combined mixture is kneaded until a homogeneous paste is obtained.

The product obtained is subsequently dried in an oven at 120° C. overnight and finally calcined under air at 900° C. for 4 hours under stationary conditions. This product is characterized by a specific surface of 75 m$^2$/g and a pure tetragonal phase.

This oxide is subsequently impregnated with a platinum (II) tetramine hydroxide salt ($Pt(NH_3)_4(OH)_2$) so as to obtain a catalyst comprising 1% by weight of platinum with respect to the weight of oxides.

The catalyst obtained is dried at 120° C. overnight and then calcined at 500° C. under air for 2 h.

EXAMPLE 2

This example relates to the preparation of a composition based on oxides of zirconium and of silicon in the respective proportions as weight of oxide of 95% and 5%.

A solution A is prepared in a stirred beaker by mixing 10.7 g of a sodium silicate solution (19% by weight, expressed as oxide) with 40 ml of an aqueous ammonia solution (29 vol %) and 330 ml of distilled water. At the same time, 184.4 g of a zirconium nitrate solution B (21% by weight, expressed as oxide) is also prepared.

Solution A and solution B are simultaneously and gradually introduced into a stirred reactor.

The suspension thus obtained is placed in an autoclave made of stainless steel equipped with a stirrer. The temperature of the medium is brought to 150° C. for 2 hours with stirring.

After returning to ambient temperature, the precipitate obtained is filtered off and washed with distilled water.

48 g of this precipitate are withdrawn.

At the same time, an ammonium laurate gel is prepared under the following conditions: 13.3 g of lauric acid are introduced into 7.8 g of aqueous ammonia (29 vol %) and 27 ml of distilled water and then the mixture is homogenized using a spatula.

48 g of this gel are added to the 48 g of the precipitate and then the combined mixture is kneaded until a homogeneous paste is obtained.

The product obtained is subsequently dried in an oven at 120° C. overnight and finally calcined under air at 900° C. for 4 hours under stationary conditions. The specific surface obtained for this product is 80 m$^2$/g.

This oxide is subsequently impregnated with a platinum (II) tetramine hydroxide salt ($Pt(NH_3)_4(OH)_2$) so as to obtain a catalyst comprising 1% by weight of platinum with respect to the weight of oxides.

The catalyst obtained is dried at 120° C. overnight and then calcined at 500° C. under air for 2 h.

EXAMPLE 3

This example relates to the preparation of a composition based on oxides of zirconium and of silicon in the respective proportions as weight of oxide of 80% and 20%.

A solution A is prepared in a stirred beaker by mixing 42.6 g of a sodium silicate solution (19% by weight, expressed as oxide) with 40 ml of an aqueous ammonia solution (29 vol %) and 330 ml of distilled water. At the same time, 155.3 g of a zirconium nitrate solution B (21% by weight, expressed as oxide) are also prepared.

The procedure is subsequently carried out as in example 2.

EXAMPLE 4

This example relates to the preparation of a composition based on oxides of zirconium, of silicon and of lanthanum in the respective proportions as weight of oxide of 80%, 10% and 10%.

A solution A is prepared in a stirred beaker by mixing 42.6 g of a sodium silicate solution (19% by weight, expressed as oxide) with 40 ml of an aqueous ammonia solution (29 vol %) and 330 ml of distilled water. At the same time, a solution B of 155.3 g of a zirconium nitrate solution (21% by weight, expressed as oxide) and of 15.0 g of a lanthanum nitrate solution (27% by weight, expressed as oxide) is also prepared.

The procedure is subsequently carried out as in example 2.

EXAMPLE 5 (COMPARATIVE)

This example relates to the preparation of a comparative composition of the type consisting of platinum supported on alumina.

A gamma transition alumina sold by Condéa is impregnated with a lanthanum nitrate solution so as to obtain, after drying and calcination under air at 500° C., an alumina stabilized with 10% by weight of lanthanum oxide.

This support is subsequently impregnated with a platinum (II) tetramine hydroxide salt ($Pt(NH_3)_4(OH)_2$) so as to obtain a catalyst comprising 1% by weight of platinum with respect to the weight of oxides.

The composition obtained is dried at 120° C. overnight and then calcined at 500° C. under air for 2 h.

EXAMPLE 6

This example describes a catalytic test using the compositions prepared in the preceding examples.

The catalytic compositions are first of all subjected to aging before the catalytic test.

Aging

In a first step, a synthetic gas mixture comprising 10 vol % of $O_2$ and 10 vol % of $H_2O$ in $N_2$ is circulated continuously over 400 mg of catalytic composition in a quartz reactor comprising the catalytic compound. The temperature of the reactor is brought to 750° C. for 16 hours under stationary conditions. The temperature subsequently returns to ambient temperature.

In a second step, a synthetic gas mixture comprising 20 vpm of $SO_2$, 10 vol % of $O_2$ and 10 vol % of $H_2O$ in $N_2$ is circulated continuously in a quartz reactor comprising the catalytic compound. The temperature of the reactor is brought to 300° C. for 12 hours under stationary conditions.

The content of the element sulfur S in the catalytic composition is measured on conclusion of the aging in order to evaluate its resistance to sulfation. Under the conditions of the aging, the maximum content of sulfur which can be captured by the catalytic composition is 1.28% by weight. The lower the sulfur content of the catalytic composition after aging, the greater its resistance to sulfation.

The aged catalytic compositions are subsequently evaluated in a catalytic test of temperature initiation (of light-off type) for the reactions of the oxidation of CO and of propene $C_3H_6$.

Catalytic Test

In this test, a synthetic mixture representative of a diesel engine exhaust gas, comprising 2000 vpm of CO, 667 vpm of $H_2$, 250 vpm of $C_3H_6$, 250 vpm of $C_3H_8$, 150 vpm of NO, 10 vol % of $CO_2$, 13 vol % of $O_2$ and 10 vol % of $H_2O$ in $N_2$, is passed over the catalytic composition. The gas mixture moves continuously with a flow rate of 30 L/h in a quartz reactor comprising 20 mg of catalytic compound diluted in 180 mg of silicon carbide SiC.

SiC is inert with regard to oxidation reactions and acts here as diluent making it possible to provide the catalytic bed with homogeneity.

During a test of light-off type, the conversion of CO and of propene $C_3H_6$ as a function of the temperature of the catalytic composition is measured. The catalytic composition is thus subjected to a temperature gradient of 10° C./min between 100° C. and 450° C. while the synthetic mixture moves through the reactor. The gases exiting from the reactor are analyzed by infrared spectroscopy at intervals of approximately 10 s in order to measure the conversion of CO and of hydrocarbons to $CO_2$ and $H_2O$.

The results are expressed as T20%, temperature of which 20% conversion of CO or of propene $C_3H_6$ is measured.

Two temperature gradients are linked together. The catalytic activity of the catalytic composition is stabilized during the first gradient. The T20% temperatures are measured during the second gradient.

The results obtained after aging are given below.

TABLE 1

| Catalytic composition | S content (% by weight) | T20% CO (° C.) | T20% $C_3H_6$ (° C.) |
|---|---|---|---|
| Example 1 | 0.38 | 200 | 215 |
| Example 2 | 0.36 | 190 | 200 |
| Example 3 | 0.13 | 210 | 225 |
| Example 4 | 0.74 | 220 | 230 |
| Comparative example 5 | 0.97 | 230 | 235 |

The results show that, for the compositions according to the invention, after aging, the resistance to sulfation is improved and that the reactions for the oxidation of Co and of $C_3H_6$ begin at a lower temperature.

What is claimed is:

1. A process for the treatment of gases including the catalytic oxidation of carbon monoxide and hydrocarbons present therein, in an oxygen-rich medium, and in the presence of a composition which comprises a metal oxidation catalyst, a silica-containing zirconia and a rare earth metal.

2. The process as defined by claim 1, said composition comprising a zirconia in which the silica content ranging from 1% to 50% by weight.

3. The process as defined by claim 2, said composition comprising a zirconia in which the silica content ranges from 5% to 30% by weight.

4. The process as defined by claim 1, said composition comprising up to 20% by weight of said rare earth metal.

5. The process as defined by claim 1, said composition comprising a precious metal oxidation catalyst.

6. The process as defined by claim 5, said composition comprising a platinum oxidation catalyst.

7. The process as defined by claim 1, comprising the treatment of a gas having an oxygen content of at least 5% by volume.

8. The process as defined by claim 1, comprising the treatment of an exhaust gas emanating from a diesel or gasoline engine.

9. Apparatus for conducting the process as defined by claim 1, including a coating of a composition which comprises a metal oxidation catalyst and a silica-containing zirconia and a rare earth metal, deposited onto a metal or ceramic monolithic substrate.

10. Apparatus for the treatment of exhaust gases emanating from a diesel or gasoline engine, for the catalytic oxidation of carbon monoxide and hydrocarbons present therein, in an oxygen-rich medium, as defined by claim 1, including a coating of a composition which comprises a metal oxidation catalyst and a silica-containing zirconia and a rare earth metal, deposited onto a metal or ceramic monolithic substrate.

11. A process for the treatment of gases for the catalytic oxidation of carbon monoxide and hydrocarbons which are present therein, in an oxygen-rich medium, characterized in that use is made, as catalyst, of a composition based on a metal which is an oxidation catalyst and on a zirconia which contains silica or silica and rare earth metal, the content of silica being comprised of between 1% and 50% by weight of silica with respect to the zirconia and silica combination; said zirconia being prepared by one of the following processes:
 a process (I) by coprecipitation of a zirconium compound with a precursor of the silica or with a precursor of the silica and rare earth metal compounds;
 a process (II) which comprises mixing with a zirconium sol a silicate or a silicate and a rare earth metal salt, drying and then calcining subsequently the suspension thus obtained;
 a process (III) by impregnation of a zirconium oxide using a solution of a silica precursor or a solution of a silica precursor and of a rare earth metal compound; or a process (IV) which comprises the following stages:
  (a) a zirconium compound, a silicon compound and, optionally a compound of the rare earth metal are brought together in a basic medium, whereby a precipitate is obtained;
  (b) said precipitate is heated in a liquid medium;
  (c) a compound chosen from anionic surfactants, nonionic surfactants, polyethylene glycols, carboxylic acids and their salts, and surfactants of the carboxymethylated fatty alcohol ethoxylates type is added to the precipitate obtained in the preceding stage; and
  (d) the precipitate thus obtained is calcined.

12. The process of claim 11, characterized in that use is made of a composition based on a zirconia in which the silica content is between 5% and 30% by weight.

13. The process of claim 11, said composition further comprising a rare earth metal.

14. The process as defined by claim 13, said composition comprising up to 20% by weight of said rare earth metal.

15. The process as defined by claim 11, said composition comprising a precious metal oxidation catalyst.

16. The process as defined by claim 15, said composition comprising a platinum oxidation catalyst.

17. The process as defined by claim 11, comprising the treatment of a gas having an oxygen content of at least 5% by volume.

18. The process as defined by claim 11, comprising the treatment of an exhaust gas emanating from a diesel or gasoline engine.

19. Apparatus for conducting the process as defined by claim 11, including a coating of a composition which comprises a metal oxidation catalyst and a silica-containing zirconia, deposited onto a metal or ceramic monolithic substrate.

20. Apparatus for the treatment of exhaust gases emanating from a diesel or gasoline engine, for the catalytic oxidation of carbon monoxide and hydrocarbons present therein, in an oxygen-rich medium, as defined by claim 11, including a coating of a composition which comprises a metal oxidation catalyst and a silica-containing zirconia, deposited onto a metal or ceramic monolithic substrate.

* * * * *